UNITED STATES PATENT OFFICE.

CLEMENS JONES, OF EASTON, PENNSYLVANIA.

PROCESS OF TREATING ORES CONTAINING HYDRATED SESQUIOXIDE OF IRON.

SPECIFICATION forming part of Letters Patent No. 480,405, dated August 9, 1892.

Application filed May 23, 1892. Serial No. 434,055. (No specimens.)

*To all whom it may concern:*

Be it known that I, CLEMENS JONES, a citizen of the United States, residing at Easton, in the county of Northampton and State of Pennsylvania, have invented certain new and useful Improvements in Processes of Treating Ores Containing Hydrated Sesquioxide of Iron; and I do hereby declare the following to be a full, clear, and exact description of the invention, such as will enable others skilled in the art to which it appertains to make and use the same.

My process is designed to treat low-grade brown ores, which consist of hydrated sesquioxide of iron mixed with such a large amount of gangue that the iron cannot be extracted profitably by any of the known methods. There are large deposits of such ore known to exist, which are now valueless, and any process that would treat them successfully and economically will be of great value. Many attempts have been made to separate the valuable part of these ores by various specific-gravity separators, especially water-jigs. None of these have been successful. They all either fail to remove a large percentage of the iron and lose much of it in the tailings, or else a low-grade concentrate is produced. A concentrate carrying forty-two per cent. of metallic iron is a fair economical result from these machines, and, except with unusually rich ores, forty-five per cent. of iron is seldom obtained. I have discovered that by heating these ores to a low heat in an ordinary roasting-furnace the hydrated oxide is rendered anhydrous and magnetic, and that on subjecting the roasted ores to the action of the magnetic influence the oxide of iron can be separated from the gangue and obtained as a very rich concentrate. These rich concentrates are then in excellent condition for any of the ordinary processes of extracting the metal.

In carrying out my process upon a practical scale I have generally used an ordinary roasting-furnace; but almost any other style of furnace can be used, except a reducing-furnace, just as well.

The style of the magnetic machine to be used to separate the magnetic portion of the roasted ore from the gangue is immaterial, any one of several now in successful operation will answer.

I have found that most brown ores become magnetic upon being heated to a cherry-red only, while some become fully magnetic at a lower temperature. There is no particular advantage of heating beyond the temperature required to develope full magnetization, and excessive heating, besides being wasteful of fuel, tends to form masses of fused or semi-fused ore, which are objectionable. When this roasting is properly performed, the ore is not fused, and the particles are rendered magnetic all the way through, so that on breaking open small lumps and carefully selecting pieces from the inside these inside pieces are found to be as strongly or even more strongly magnetic than the exterior of the lumps.

It is well known that metallic iron is magnetic, and also that compounds containing protoxide of iron are magnetic. Instances of native anhydrous sesquioxide of iron showing magnetic properties are also known; but magnetic properties have never been observed in any of the hydrated sesquioxides of iron. It is also well known that heating the sesquioxide of iron intensely will cause it to fuse and lose a part of its oxygen and be converted into the magnetic oxide; but the heat that I use is much below that required for this reaction, and, indeed, the analysis of the roasted ores fails to show any notable increase in the amount of protoxide of iron present. Thus, in one instance, concentrates carrying sixty per cent. of iron showed only 3.07 per cent. of protoxide of iron, while the raw ore contains nearly the same amount. From these facts I conclude that the magnetization is not due to any reduction of the amount of oxygen combined with the iron, but is entirely due to physical changes taking place in connection with the expulsion of the water from the oxide.

Having explained the details of my invention, I will proceed to describe its practical application at a typical brown-ore mine.

The gross product or "run of mine" of such a mine will consist of pieces of mixed ore and gangue, varying greatly in size. On the average one-quarter of this is separated by passing over suitable screens with a mesh of one to two inches and yields good smelting ore. The balance of the ore, which is generally called "wash ore," is next charged into a roasting-furnace with fuel enough to generate sufficient heat for the magnetization of the hydrated oxide of iron in the ore. One part of fuel is generally sufficient to roast thirty to forty parts of ore. As soon as the ore reaches the proper temperature, which is generally about a cherry-red, the roasted ore is withdrawn from the bottom of the furnace and a fresh charge is added at the top. In this way the roasting becomes a continuous operation. As soon as the roasted ore is drawn from the furnace it is sent to the magnetic separators, of which the style known as the "Monarch" has yielded good results. The magnetic concentrators deliver the rich concentrate at one point and reject the worthless material at another. The rich concentrates are next smelted by any suitable smelting process to extract the iron they contain. Before the ore particles reach a red heat in the process of roasting violent decrepitation takes place, thus breaking or splitting up into small fragments all the lumps of ore. The practical advantage of this decrepitation is very great, since it does away with the necessity of crushing the ore. The roasted ore is sufficiently broken up to allow the magnets to extract a very high percentage of the magnetized particles.

What I claim as new and valuable is—

1. The process of treating iron ore containing hydrated sesquioxide of iron, which consists in converting the hydrated sesquioxide of iron into an anhydrous and magnetic sesquioxide of iron by roasting the ore without fusion and then subjecting the roasted ore to the action of magnets to separate the magnetized oxide of iron from the non-magnetic portion of the ore, substantially as described.

2. The process of extracting iron from low-grade ore containing hydrated sesquioxide of iron, which consists in converting the hydrated sesquioxide of iron into an anhydrous and magnetic sesquioxide of iron by roasting the ore without fusion, subjecting the roasted ore to the action of magnets to separate the magnetized oxide of iron from the non-magnetic portion of the ore, and reducing the metal from the magnetic concentrates, substantially as described.

3. The process of treating the run of the mine of brown ore, which consists in screening to separate the lumps of ore from the fine material, roasting the fine material without fusion to convert the hydrated sesquioxide of iron contained therein into an anhydrous and magnetic sesquioxide of iron, and separating the magnetized oxide of iron from the non-magnetic material by the action of magnets, substantially as described.

In testimony whereof I affix my signature in presence of two witnesses.

CLEMENS JONES.

Witnesses:
CYRIS L. SCHLABACH,
OSCAR P. HOFFMAN.